United States Patent [19]

Courtney

[11] Patent Number: 5,067,679
[45] Date of Patent: Nov. 26, 1991

[54] FLEXIBLE WASTE HOSE SUPPORT FOR RECREATIONAL VEHICLES

[76] Inventor: Charles H. Courtney, 2970 Gardner, Berkley, Mich. 48072

[21] Appl. No.: 623,198

[22] Filed: Dec. 6, 1990

[51] Int. Cl.⁵ ............................................. A62C 13/76
[52] U.S. Cl. ........................................ 248/75; 248/49
[58] Field of Search ...................... 248/49, 75, 76, 80, 248/87, 88; 138/106, 103, 110

[56] References Cited

U.S. PATENT DOCUMENTS

| | | | |
|---|---|---|---|
| 788,424 | 4/1905 | Ochs | 14/69.5 X |
| 873,272 | 12/1907 | Sheley | 14/69.5 X |
| 3,319,913 | 5/1967 | Schoepe | 248/75 |
| 3,469,601 | 9/1969 | Harper . | |
| 3,623,500 | 12/1969 | Hoy . | |
| 3,730,228 | 5/1973 | Gibbs, Sr. . | |
| 3,809,348 | 5/1974 | Di Laura . | |
| 3,819,137 | 6/1974 | Smith . | |
| 4,102,523 | 7/1978 | Finnell | 248/49 |
| 4,125,237 | 11/1978 | Hagins . | |
| 4,133,347 | 1/1979 | Mercer . | |
| 4,169,571 | 10/1979 | Duggan . | |
| 4,194,711 | 3/1980 | Winton . | |
| 4,223,702 | 9/1980 | Cook | 138/106 |
| 4,228,978 | 10/1980 | Rand | 248/49 |
| 4,403,758 | 9/1983 | Burt . | |
| 4,406,434 | 9/1983 | Schneckloth . | |
| 4,449,696 | 5/1984 | Hengesbach | 248/75 X |
| 4,650,224 | 3/1987 | Smith . | |
| 4,712,755 | 12/1987 | Robbins | 248/49 |
| 4,715,570 | 12/1987 | Mashuda | 138/106 X |
| 4,779,650 | 10/1988 | Sargent et al. . | |
| 4,844,121 | 7/1989 | Duke . | |
| 4,905,939 | 3/1990 | Horn | 248/75 X |

Primary Examiner—J. Franklin Foss
Attorney, Agent, or Firm—Harness, Dickey & Pierce

[57] ABSTRACT

Disclosed is a flexible waste hose support device configured including at least two trough-like members for accepting a flexible waste hose. A first trough-like member accepts a second trough-like member in a telescoping friction fit by means of dual tracks running along the top edges of the first trough-like member. The flexible waste hose support can therefore be adjusted to the appropriate distance between a recreational vehicle waste outlet port and a sewage disposal inlet port. The support trough includes at one end a hoop which is adapted to connect one end of the support trough to the underside of the recreational vehicle, and a hooking device at the opposite end to hook to the edge of the inlet port of the sewage disposal tank. A second preferred embodiment includes a third trough-like member for accepting the second trough-like member such that the second trough-like member is slidably engageable with both the first and third trough-like members. By this, the support trough can be rigidly fixed in the appropriate configuration to facilitate efficient removal of the waste through a flexible hose supported in the trough without the need for other supporting devices, and further, be easily stored when not in use.

25 Claims, 2 Drawing Sheets

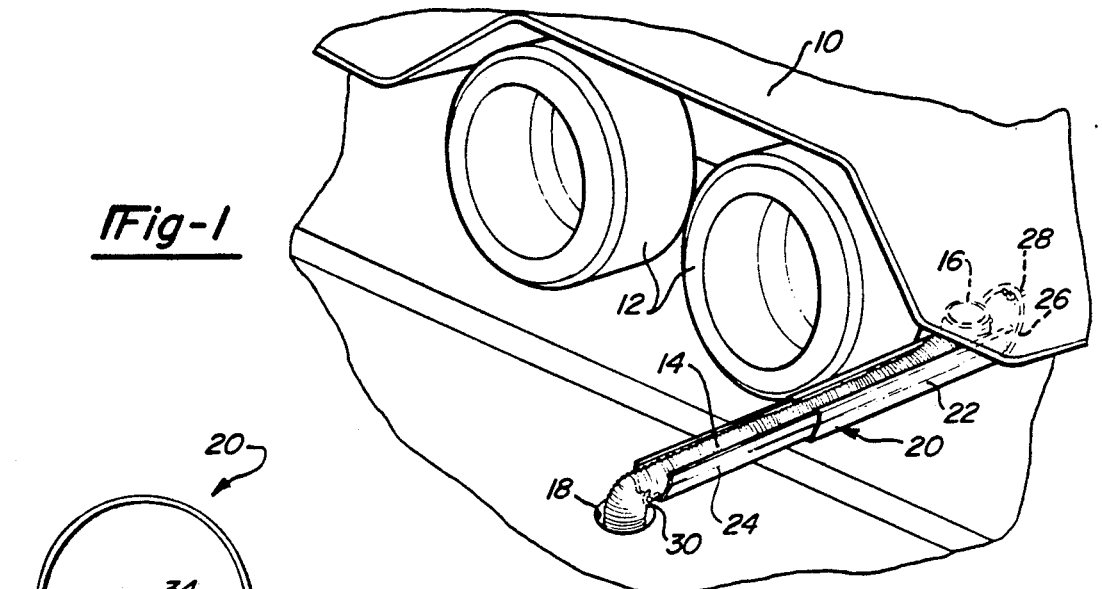
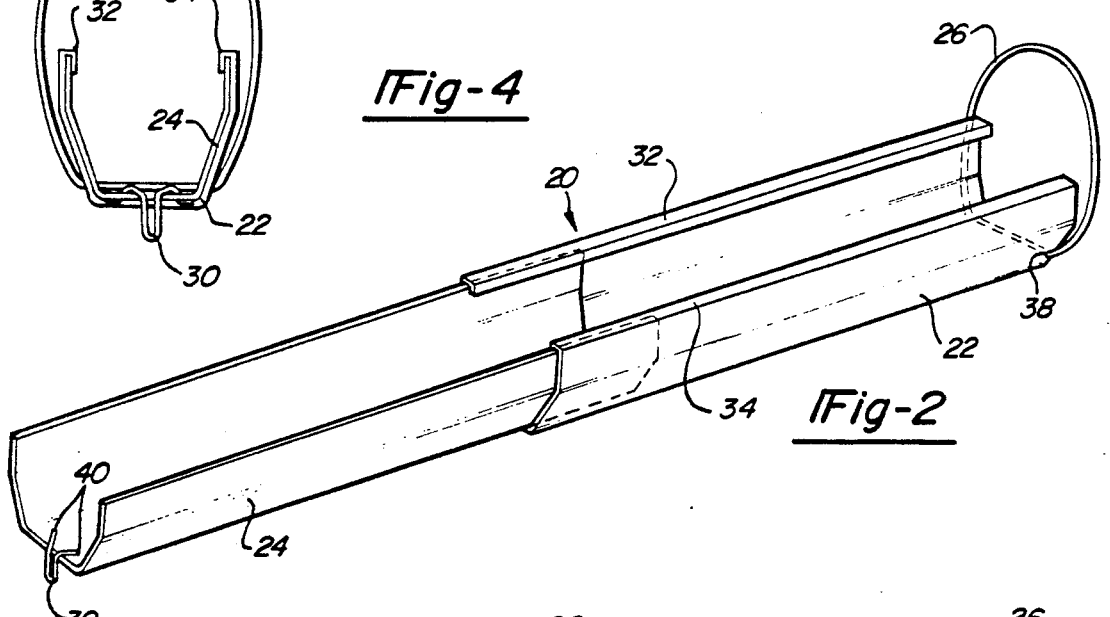
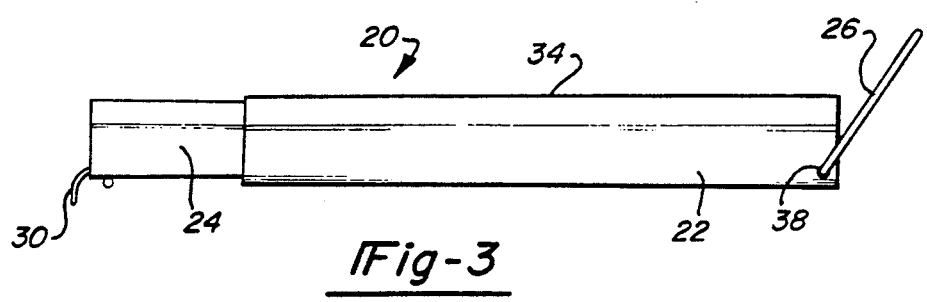

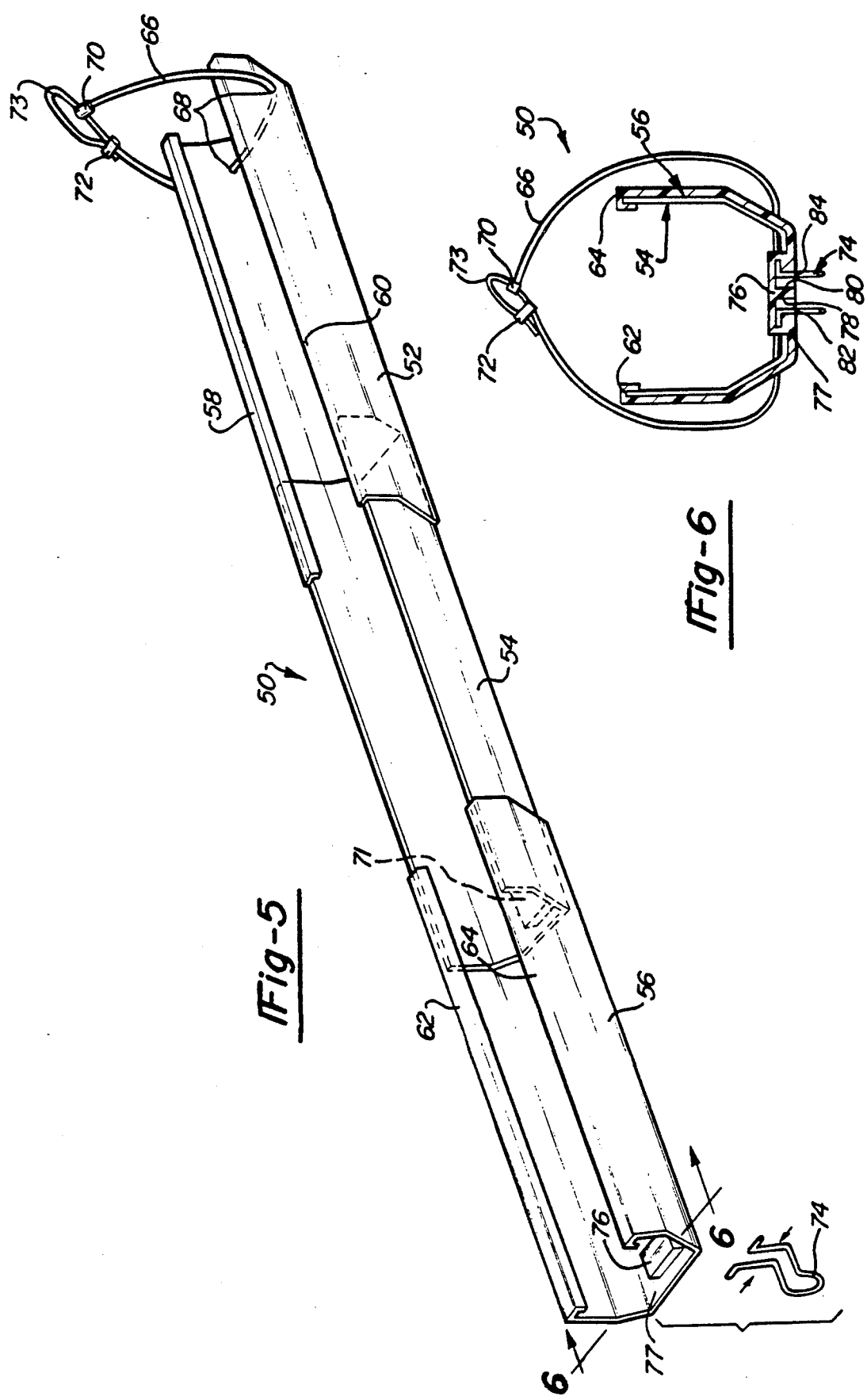

FLEXIBLE WASTE HOSE SUPPORT FOR RECREATIONAL VEHICLES

BACKGROUND OF THE INVENTION

1. Field of the Invention

The present invention is related generally to a support for a flexible waste hose, and more specifically, to a support for a flexible waste hose used for discarding waste from a holding tank of a recreational vehicle to a waste disposal tank.

2. Discussion of the Related Art

Most modern recreational vehicles (RV), trailers and mobile homes generally include at least one or all of a sink, shower and toilet. Waste from these facilities is usually directed into a holding tank located within the specific vehicle. Obviously, this holding tank within the vehicle must be periodically emptied depending on the size of the tank, and the extent to which the facilities are used. Therefore, the holding tank is equipped with a discharge nozzle generally located at the underside of the vehicle for connection to a flexible waste hose. The waste hose is extended from the discharge nozzle to an appropriate waste or sewer tank for discharging the waste materials from the holding tank to the sewer tank. In addition, appropriately outfitted campsites generally include a waste tank, or sewer pipe directed to a waste tank, at each individual campsite such that the waste material from the vehicle can be continuously emptied by means of the waste hose from the holding tank within the vehicle, so that the waste material need not be stored in the vehicle.

Generally the flexible waste hose will extend from the vehicle to an inlet port associated with the sewer tank a distance approximately up to eight (8) feet. Because of this distance and the flexibility of the waste hose, the hose will generally fall directly to the ground from the underside of the vehicle, and thus travel along the ground most of the way from the vehicle to the port of the sewer tank. Therefore, a problem can arise since the waste material is propelled through the hose by means of gravity. Once the waste material reaches the section of the hose lying on the ground it must rely on its momentum and the force of the waste material behind it to travel the remaining distance to the sewer tank. Because of this, the slope of the terrain and the volume and constituents of the waste material become an important factor in providing proper flow of the waste material through the hose. Many times the waste material will not flow effectively and may not even flow at all. Therefore, proper disposal of the waste material is not always effectuated.

Many RV owners have attempted to remedy this situation by utilizing boards or branches, or other various types of articles which may be handy, to create an incline between the RV and the sewer tank upon which the hose can rest to facilitate the proper flow of waste material through the hose. These types of makeshift remedies are generally not very reliable, convenient or properly effective.

Several devices are known in the prior art which have attempted to alleviate the above-described problem. However, many of these devices are not convenient, easily assembled, easily stored, and inexpensive. What is needed then is a device to provide the appropriate pitch between the holding tank outlet of a recreational vehicle and the port to a sewage tank by means of an easily stored, conveniently installed and inexpensively made flexible waste hose support. It is therefore an object of the present invention to provide such a device

SUMMARY OF THE INVENTION

Disclosed is a telescoping support trough for a flexible waste hose of a recreational vehicle. The telescoping support trough includes a first member having a substantially semi-circular, trough-like shape, and a pair of tracks on both sides of the first member for accepting a second member having substantially the same shape as the first member. The second trough member is slidable along the tracks on the inside surface of the first trough member in a friction type arrangement. In addition, a third member having a trough-like shape can be engaged with the second trough member opposite the first trough member, also in a telescoping friction type arrangement to extend the usable length of the support trough. Positioned at one end of the telescoping support trough is a bail or hoop rigidly attached to the support trough for hooking to an appropriate member of the recreational vehicle near the discharge nozzle of the holding tank. At the opposite end of the support trough is a hook member which is configured to be hooked into the inlet port of the sewer tank. Therefore, the support trough is rigidly affixed at both of its ends, and does not require any middle supporting devices. The flexible waste hose will lie in the support trough at an appropriate pitch to facilitate efficient flow or the waste material through the hose. The telescoping nature of the support trough enables the support trough to be adjusted between different distances between the RV vehicle and the opening of the sewer tank, and further, enables the support trough to be easily reduced to its minimum length very quickly for convenient storage.

Additional objects, advantages and features of the present invention will become apparent from the following description and appended claims, taken in conjunction with the accompanying drawings.

BRIEF DESCRIPTION OF THE DRAWINGS

FIG. 1 is a fragmented perspective view of the back end of an RV vehicle including an attached waste hose support trough according to a first preferred embodiment of the present invention;

FIG. 2 is a perspective view of the waste hose support trough according to the preferred embodiment of the present invention;

FIG. 3 is a side view of the support trough according to the preferred embodiment of the present invention;

FIG. 4 is an end view of the support trough according to the preferred embodiment of the present invention;

FIG. 5 is a perspective view of the waste hose support trough according to a second preferred embodiment of the present invention; and FIG. 6 is a cut-away end view along line 6—6 of FIG. 5 of the support trough according to the second preferred embodiment of the present invention.

DETAILED DESCRIPTION OF THE PREFERRED EMBODIMENT

The following description of the preferred embodiment of the present invention is merely exemplary in nature and is in no way intended to limit the invention or its application or uses.

Turning to FIG. 1, part of a recreational vehicle 10, including dual back tires 12, is shown. A flexible waste hose 14 is shown extending from an outlet port 16 of a holding tank (not shown) of the recreational vehicle 10 to an inlet port 18 of a sewage tank (not shown). Outlet port 16 will generally include a valve (not shown) and a specific type of quick disconnect (not shown) for ease of connection of hose 14 to port 16. Flexible waste hose 14 is seen positioned within a support trough 20, according to a first preferred embodiment of the present invention. Support trough 20 includes a first trough member 22 receiving a second trough member 24 in a variably positional configuration by means of a friction engagement described below. First trough member 22 is generally positioned closest to the vehicle 10 and includes a bail or hoop 26 rigidly affixed to member 22 to conveniently secure that end of support trough 22 to a catch member 28 associated with vehicle 10 proximate outlet port 16. Generally, member 28 will be some type of hooking device purposely affixed to vehicle 10 for accepting hoop 26, or can be a conveniently located part of RV 10 which is used for other purposes. At the opposite end of support trough 20 nearest inlet port 18, and positioned on second trough member 24, is a hooking member 30. Hooking member 30 is configured to catch onto the edge or lip of inlet port 18 as shown. The friction fit between first member 22 and second member 24 of support trough 20 is tight enough that second member 24 can be positioned within first member 22 with a reasonable amount of force, and support trough 22 will remain in the position in which it is put in against the hooking forces of hook member 30 and hoop 26, as shown in FIG. 1.

In operation, waste will be discharged through outlet port 16 from the holding tank within vehicle 10 into flexible waste hose 14. Flexible waste hose 14 will carry the waste material to the inlet port 18 of the sewage tank. Support trough 20 will provide a rigid support to keep flexible hose 14 in an appropriate pitch such that waste material will readily flow through hose 14 by means of gravity. Hoop 28 and hook member 30 will ensure that support trough 20 is retained in the appropriate position against reasonable forces.

A driver of the recreational vehicle 10 will attempt to position vehicle 10 in a convenient position relative to inlet port 10. Sometimes, it is not possible to position vehicle 10 in the most desirable location for one reason or another. Support trough 20 is capable of being configured at many angles relative to vehicle 10 and is adjustable over a substantial distance. Once in position, the driver can easily and quickly connect the support trough 20 in the configuration as shown in FIG. 1.

Now turning to FIG. 2, a perspective view of support trough 20 according to the first preferred embodiment of the present invention is shown. In this view, second trough member 24 has been extended from first trough member 22 almost its entire length. As can be seen, second trough member 24 rides in tracks 32 and 34 positioned at the upper edges of first trough member 22 along its entire length. Tracks 32 and 34 are integral with first trough member 22 and as such are formed as the upper edges of first trough member 22. At one end of support trough 20, aligned holes 38 are positioned in opposite walls of first trough member 22 in order to accept hoop 26. Hoop 26 is generally a substantially rigid metal wire formed into a hoop configuration after being threaded through aligned holes 38. The diameter of hoop 26 can be varied to accommodate engagement with certain structures on the under carriage of any type of vehicle 10. At the opposite end of trough 20 from hoop 26 is hook member 30. Hook member 30 is positioned in second trough member 24 through two adjacent holes 40 in a bottom portion of trough member 24, as shown. Generally, a portion of hook member 30 will run along the inside surface of the bottom portion of trough member 24 and extend through holes 40 at one end. The other end of hook member 30 is bent down substantially perpendicular to the bottom portion of trough member 24. Hook member 30 can be a substantially rigid metal wire formed into an appropriate shape to rigidly secured to trough member 24 after being threaded through holes 40.

Trough members 22 and 24 are generally made of a plastic material, and thus can take on any trough like configuration by an appropriate molding process. In the embodiment discussed above, tracks 32 and 34 are integral with first trough member 22. However, these tracks members can be separate pieces attached to first trough member 22 by appropriate means. In addition, hoop 26 is shown on first trough member 22 and hook member 30 is shown on second trough member 24. These two devices can be reversed such that hook member 30 is positioned on first trough member 22 and hoop 26 is positioned on second trough member 24. Further, other means for connecting support trough 22 to recreational vehicle 10 and inlet port 18 can be used without departing from the spirit of the preferred embodiment.

Now turning to FIG. 3, a side view, of support trough 20 is shown. In this view, second trough member 24 has been retracted into first trough member 22 most of its length. As can be seen second trough member 24 can be positioned all the way into first trough member 22 until hook member 30 contacts the end of trough member 22 opposite hoop 26, or the end of second trough member 24 opposite hook member 30 contacts hoop 26. In addition, hoop 26 is movable about an axis defined by aligned holes 38 such that hoop 26 can be positioned at any location not occupied by trough member 22. Therefore, support trough 20 can be collapsed to a size approximately equal to first trough member 22 for ease of storage. Hook member 30 can be seen to extend beyond the end of trough member 24, and is bent downward to form the hook. In addition, an end of hook member 30 extending through holes 40 can be seen to be flush against an outer surface of the bottom portion of trough member 24.

Now turning to FIG. 4, an end view looking down support trough 20 from the end of trough member 24 having hook member 30 is shown. The ends of hook member 30 extending through holes 40 can be seen to be rigidly secured to trough member 24 by being wedged against the outer surface of the bottom portion of trough member 24. In this view, it can be seen that trough members 22 and 24 take on a general U-shaped configuration having several contiguous flat surfaces. However, different designs can be incorporated to realize any trough-like configuration having an appropriate size for accepting hose 14. In addition, the friction fit between the tracks 32 and 34 and the upper edges of trough member 24 can be visualized. The thickness of the walls of second trough member 24 is substantially the same as the width of the inside of each of the tracks 32 and 34 to provide the desirable friction fit. It is noted that second trough member 24 car be completely removed from first trough member 22. However, means can be incorporated to provide a stop at the end of second trough member 24 to keep trough 24 from being completely removed from trough member 22.

Now turning to FIG. 5, a second preferred embodiment of the present invention is shown. Here, a support trough 50 includes three trough members 52, 54, and 56. A first trough member 52 is similar to trough member 22 of FIG. 2 having integral tracks 58 and 60. In addition, bail 66 is configured to be adjustable and is made of a pliable material such as a metal. Specifically, bail 66 is positioned in aligned holes 68 in trough member 52, as with the first embodiment, but further including an end member 70 having a hole for accepting an opposite end of bail 66 formed into a loop 73, as shown. Loop 73 includes a friction type clasping member 72 to maintain loop 73 in a fixed configuration. Further, clasping member 72 enables loop 73 to be adjustable by sliding clasping member 72 along bail 66 to alter the diameter of bail 66. Therefore, bail 66 can be adjusted to accommodate different catching members on RV 10.

At an opposite end of first trough member 52 from bail 66 is a second trough member 54 slidably engageable with trough member 52 by means of a friction fit within integral tracks 58 and 60. Second trough member 54 is substantially similar to trough member 24 of the first preferred embodiment of FIG. 2. At an end of second trough member 54 opposite first trough member 52 is a third trough member 56 slidably engageable with second trough member 54. Third trough member 56 includes integral track members 62 and 64, as with first trough member 52, but includes, at an end opposite second trough member 54, a hook member 74. Here, hook member 74 is shown separated from trough member 56, which will be described hereunder. Hook member 74 is generally a rigid wire shaped into a hooking configuration as shown, and rigidly positioned within a hump portion 76 (see FIG. 6) of third trough member 56 proximate an end opposite second trough member 54. Hump portion 76 is formed in a bottom portion 77 of third trough member 56. Hook member 74 is positioned along an outer surface of bottom portion 77 and rigidly affixed within hump portion 76, as will be described hereunder.

In this embodiment, support trough 50 is positionable to a greater distance than that of the first embodiment. Each trough member 52, 54 and 56 is approximately 2½ feet long, and therefore, support trough 50 can extend up to a distance of approximately 7 feet. Second trough member 54 is collapsible entirely within one or both of first trough member 52 or third trough member 56 such that the adjacent ends of first trough member 52 and second trough member 56 are in contact with each other, thus reducing the overall length of support trough 50 to a minimum length of approximately 5 feet. In addition, third trough member 56 can be completely removed if this extra distance is not required or for minimizing storage space thereby reducing the overall length to 2½ feet. In this case, hook member 74 can be removed from hump portion 76 by squeezing legs 82 and 84 together (see FIG. 6) and pulling downward, and can then be positioned within a hump portion 71 positioned within second trough member 54 in the same manner. It is noted that, the adjustable bail 66 and removable hook member 74 of the second preferred embodiment can be mixed and matched with the nonadjustable bail 26 and rigid hook member 30 of the first embodiment to get the desirable properties for a specific application.

Now turning to FIG. 6, an end view of the second preferred embodiment of the trough support 50 is shown taken along a cut-away view of lines 6—6 of FIG. 5. Shown here is third trough member 56 and second trough member 54. Third trough member 56 includes hump portion 76, which here has been cutaway and shown in section. Hump portion 76 includes two channels 78 and 80 which are opened to the outer surface of bottom portion 77. Open channels 78 and 80 are generally in an L configuration facing away from each other, as shown. The ends 82 and 84 of hook member 74 are also in an L configuration to substantially mate with the channels 78 and 80 of hump portion 76. Hook member 74 is generally a substantially rigid metal which has been bent or formed in the appropriate shape. In this embodiment, ends 82 and 84 can be squeezed together and removed from channels 78 and 80, as described above. By this, hook member 74 can either be placed in hump portion 76 of third trough member 56 or hump portion 71 of second trough member 54. While the hump portion 76 may be located on the internal surface of the trough member 56, the hump portion 76 may also be located on the outer surface of the trough member 56 which would potentially facilitate manufacturing of the trough member 56.

By the above disclosure, a support trough for a flexible waste hose of a recreational vehicle is incorporated to provide an effective device to facilitate efficient removal of waste from the vehicle. This trough is designed to have minimal necessary components, and further, to be inexpensive and easily stored. There are no separate parts of the support trough which could get lost or would require any type of assembly to put the trough in use. In addition, the trough is readily collapsible for quick and efficient storage while not in use.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:
1. A flexible waste hose support comprising:
   a first trough-like member having a first end and a second end, said first trough-like member including integral tracks formed along substantially the entire length at its upper edges;
   a second trough-like member having a first end and a second end, wherein said first trough-like member receives said second trough-like member at the second end of the first trough-like member and the first end of the second trough-like member in a telescoping fashion such that the upper edges of the second trough-like member engage within the integral tracks in a friction fit;
   hoop means secured proximate to the first end of said first trough-like member for connecting said first end of said first trough-like member to a vehicle proximate a waste outlet of said vehicle; and
   a wire hook rigidly connected to a bottom portion of the second trough-like member proximate the second end of the second trough-like member.

2. The flexible waste hose support according to claim 1 further comprising a third trough-like member having a first end and a second end, said third trough-like member receiving said second trough-like member at the first end of said third trough-like member and the second end of said second trough-like member in a friction engagement by means of tracks running along the upper edges of said third trough-like member.

3. The flexible waste hose support according to claim 1 wherein means extends through substantially aligned holes within opposite walls of the first trough-like member.

4. The flexible waste hose support according to claim 3 wherein the hoop means is adjustable to different sized diameters.

5. The flexible waste hose support according to claim 1 wherein the hook extends through the bottom portion of the second trough-like member, said hook being wedged to said bottom portion.

6. The flexible waste hose support according to claim 1 wherein said hook is removably engageable within at least one channel positioned in the bottom portion of the second trough-like member.

7. The flexible waste hose support according to claim 1 wherein both the first trough-like member and the second trough-like member are made of a plastic and wherein the integral tracks are molded to the first trough-like member.

8. A flexible waste hose support comprising:
a first trough-like member having a first end and a second end;
a second trough-like member having a first end and a second end, said first trough-like member receiving said second trough-like member at the second end of the first trough-like member and the first end of the second trough-like member in a telescoping fashion;
hoop means secured proximate to the first end of said first trough-like member for connecting said first end of said first trough-like member to a vehicle proximate a waste outlet of said vehicle; and
a hook member positioned proximate the second end of the second trough-like member, wherein said hook member extends downwardly from a bottom portion of the second trough-like member.

9. The flexible waste hose support according to claim 8 further comprising a third trough-like member having a first end and a second end, said third trough-like member receiving said second trough-like member at the first end of said first trough-like member and the second end of said second trough-like member in a friction engagement by means of tracks running along the upper edges of said third trough-like member.

10. The flexible waste hose support according to claim 8 wherein said first trough-like member includes a plurality of molded tracks operable to receive said second trough-like member.

11. The flexible waste hose support according to claim 8 wherein said first trough-like member includes at least one molded track portion for accepting said second trough-like member in a friction fit such that said second trough-like member is slidable on an inner surface of said first trough-like member.

12. The flexible waste hose support according to claim 11 wherein the at least one track portion is two tracks integrally formed at the upper edges of the first trough-like member, the integral tracks accepting the upper edges of the second trough-like member is a friction fit.

13. A flexible waste hose support according to claim 8 wherein the hoop means extends through substantially aligned holes within opposite walls of the first trough-like member.

14. The flexible waste hose support according to claim 13 wherein the hoop means is adjustable to different sized diameters.

15. A flexible waste hose support according to claim 8 wherein the hook member extends through the bottom portion of the second trough-like member, said hook member being wedged to said bottom portion.

16. The flexible waste hose support according to claim 8 wherein said hook member is removably engageable within at least one channel positioned in the bottom portion of the second trough-like member.

17. A flexible hose support comprising:
a first trough-like member having a first end and a second end;
a second trough-like member having a first end and a second end, said first trough-like member receiving said second trough-like member at the second end of the first trough-like member and the first end of the second trough-like member in a telescoping fashion;
hoop means secured proximate to the first end of said first trough-like member for connecting said first end of said first trough-like member to a vehicle proximate a waste outlet of said vehicle; and
a hook member connected to the second end of said second trough-like member, wherein said hook member is a rigid wire positioned within at least one hole in a bottom portion of the second trough-like member and extends beyond the second end of said second trough-like member.

18. The flexible waste hose support according to claim 17 further comprising a third trough-like member having a first end and a second end, said third trough-like member receiving said second trough-like member at the first end of said third trough-like member and the second end of said second trough-like member in a friction engagement by means of tracks running along the upper edges of said third trough-like member.

19. The flexible waste hose support according to claim 17 wherein the first trough-like member includes a track on each upper edge of the first trough-like member, each track accepting an upper edge of the second trough-like member such that the second trough-like member is slidable on an interior surface of the first track like member in a friction fit engagement.

20. The flexible waste hose support according to claim 17 wherein the hoop means extends through substantially aligned holes in opposite walls of the first trough-like member.

21. The flexible waste hose support according to claim 20 wherein the hoop means is adjustable to different sized diameters.

22. The flexible waste hose support according to claim 19 wherein the tracks are integral with the first trough-like member.

23. A flexible waste hose support comprising:
a first trough-like member having a first end and a second end;
a second trough-like member having a first end and a second end, said first trough-like member receiving said second trough-like member at the second end of the first trough-like member and the first of the second trough-like member in a telescoping fashion;
a third trough-like member having a first end and a second end, said third trough-like member receiving said second trough-like member at the first end of the third trough-like member and the second end of the second trough-like member in a telescoping fashion;

hoop means secured proximate to the first end of said first trough-like member for connecting said first end of said first trough-like member to a vehicle proximate a waste outlet of said vehicle; and wherein said second trough-like member is slidable along an inner surface of both the first and third trough-like members, and wherein each of the second ends of the second and third trough-like members include means to accept a hook member.

24. The flexible waste hose support according to claim 23 wherein said first trough-like member includes a plurality of molded tracks operable to receive said second trough-like member.

25. The flexible waste hose support according to claim 23 wherein each of the upper edges of said first trough-like member and said third trough-like member include tracks for accepting the upper edges of said second trough-like member in a friction type engagement.

* * * * *